US012737319B2

(12) United States Patent
Sunny et al.

(10) Patent No.: US 12,737,319 B2
(45) Date of Patent: Sep. 15, 2026

(54) SYSTOLIC MEMORY ACCESS

(71) Applicant: Micron Technology, Inc., Boise, ID (US)

(72) Inventors: Febin Sunny, Folsom, CA (US); Saideep Tiku, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 15 days.

(21) Appl. No.: 18/651,461

(22) Filed: Apr. 30, 2024

(65) Prior Publication Data

US 2024/0370403 A1 Nov. 7, 2024

Related U.S. Application Data

(60) Provisional application No. 63/499,918, filed on May 3, 2023.

(51) Int. Cl.
*G06F 15/80* (2006.01)
*G06F 13/14* (2006.01)
*H04B 10/80* (2013.01)

(52) U.S. Cl.
CPC .......... *G06F 15/8046* (2013.01); *G06F 13/14* (2013.01); *G06F 15/80* (2013.01); *H04B 10/802* (2013.01)

(58) Field of Classification Search
None
See application file for complete search history.

(56) References Cited

U.S. PATENT DOCUMENTS 6,727,903 B1 * 4/2004 Yamada .................... G06T 1/20 712/E9.067
8,953,953 B2 * 2/2015 Abe ..................... H04B 10/616 398/208
10,019,169 B2 * 7/2018 Kato ....................... G06F 3/065
10,254,968 B1 * 4/2019 Gazit .................... G06F 3/0611
2002/0071159 A1 * 6/2002 Lange ..................... H04L 12/46 398/79
2005/0071733 A1 * 3/2005 Fukae .................. G06F 13/426 714/776
2005/0123300 A1 * 6/2005 Kim ...................... H04J 14/025 398/84
2009/0136234 A1 * 5/2009 Mottahedin ........... H04B 10/40 398/135
2019/0033542 A1 * 1/2019 Epitaux ................ G02B 6/4226
2023/0385154 A1 * 11/2023 Karr .................... H04L 67/1095
2024/0073800 A1 * 2/2024 Abotabl ................ H04W 48/18

* cited by examiner

*Primary Examiner* — Michael Sun
(74) *Attorney, Agent, or Firm* — Greenberg Traurig

(57) ABSTRACT

Techniques to access memory in a systolic pattern. For example, a processor sub-system is connected between a first memory sub-system and a second memory sub-system. In response to a first clock signal, a communication direction of a first connection between the processor sub-system and the first memory sub-system is configured to receive first data in the processor sub-system from the first memory sub-system; and a communication direction of a second connection between the processor sub-system and the second memory sub-system is configured to transmit second data from the processor sub-system to the second memory sub-system. In response to a second clock signal, the communication direction of the first connection and the communication direction of the second connection are reversed.

19 Claims, 8 Drawing Sheets

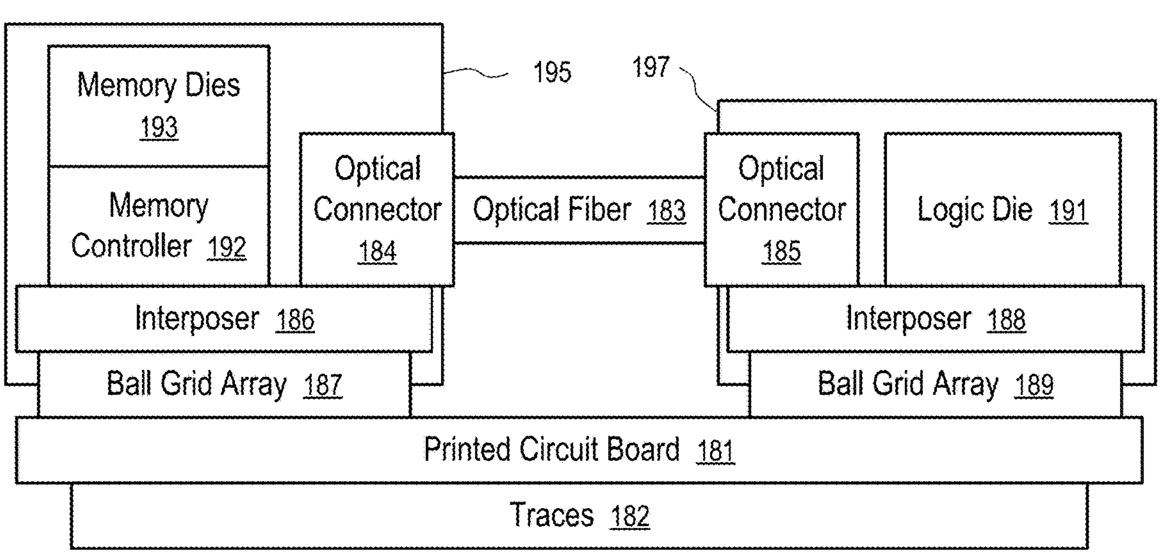
FIG. 6
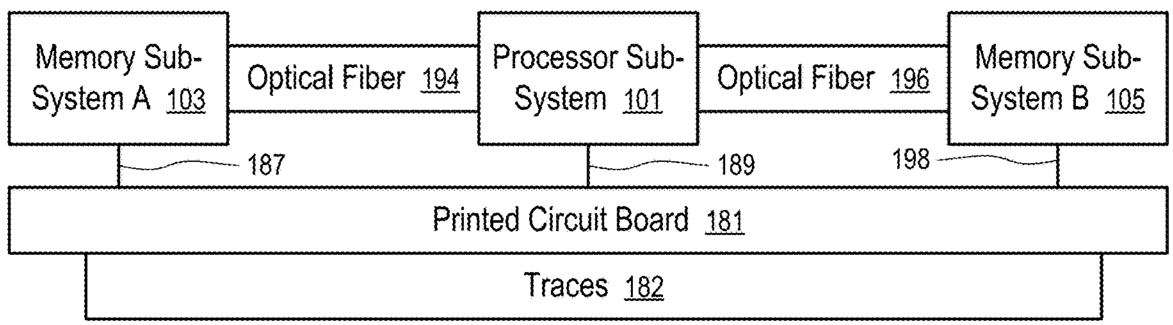
FIG. 7
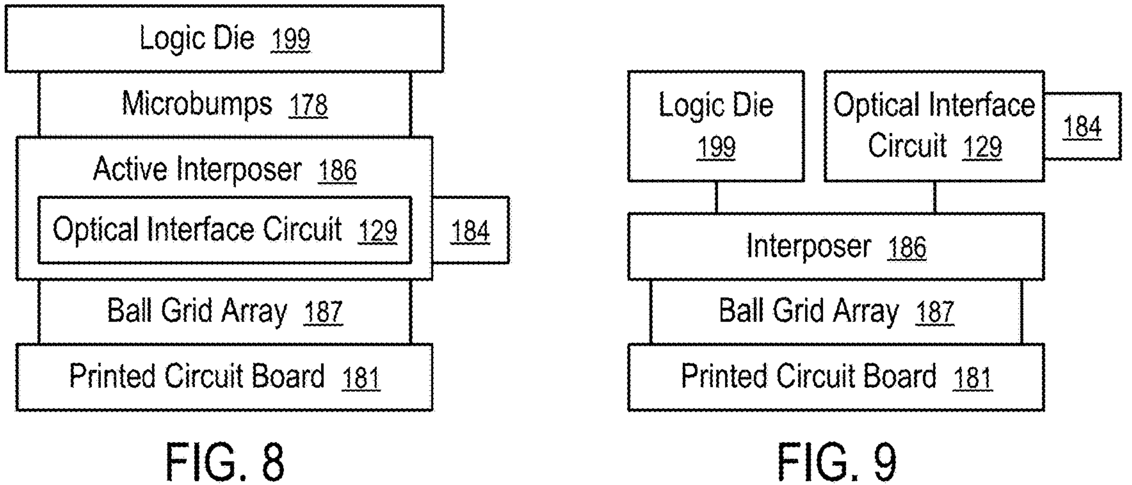
FIG. 8
FIG. 9

SYSTOLIC MEMORY ACCESS

RELATED APPLICATIONS

The present application claims priority to Prov. U.S. Pat. App. Ser. No. 63/499,918 filed May 3, 2023, the entire disclosures of which application are hereby incorporated herein by reference.

TECHNICAL FIELD

At least some embodiments disclosed herein relate to memory access in general and more particularly, but not limited to, memory access via optical connections.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 6 shows a configuration to connect a memory sub-system and a processor sub-system according to one embodiment.

FIG. 7 shows a configuration to connect memory sub-systems and a processor sub-system for systolic memory access according to one embodiment.

FIG. 8 and FIG. 9 show techniques to connect a logic die to a printed circuit board and an optical fiber according to one embodiment.

DETAILED DESCRIPTION

Figure 1:
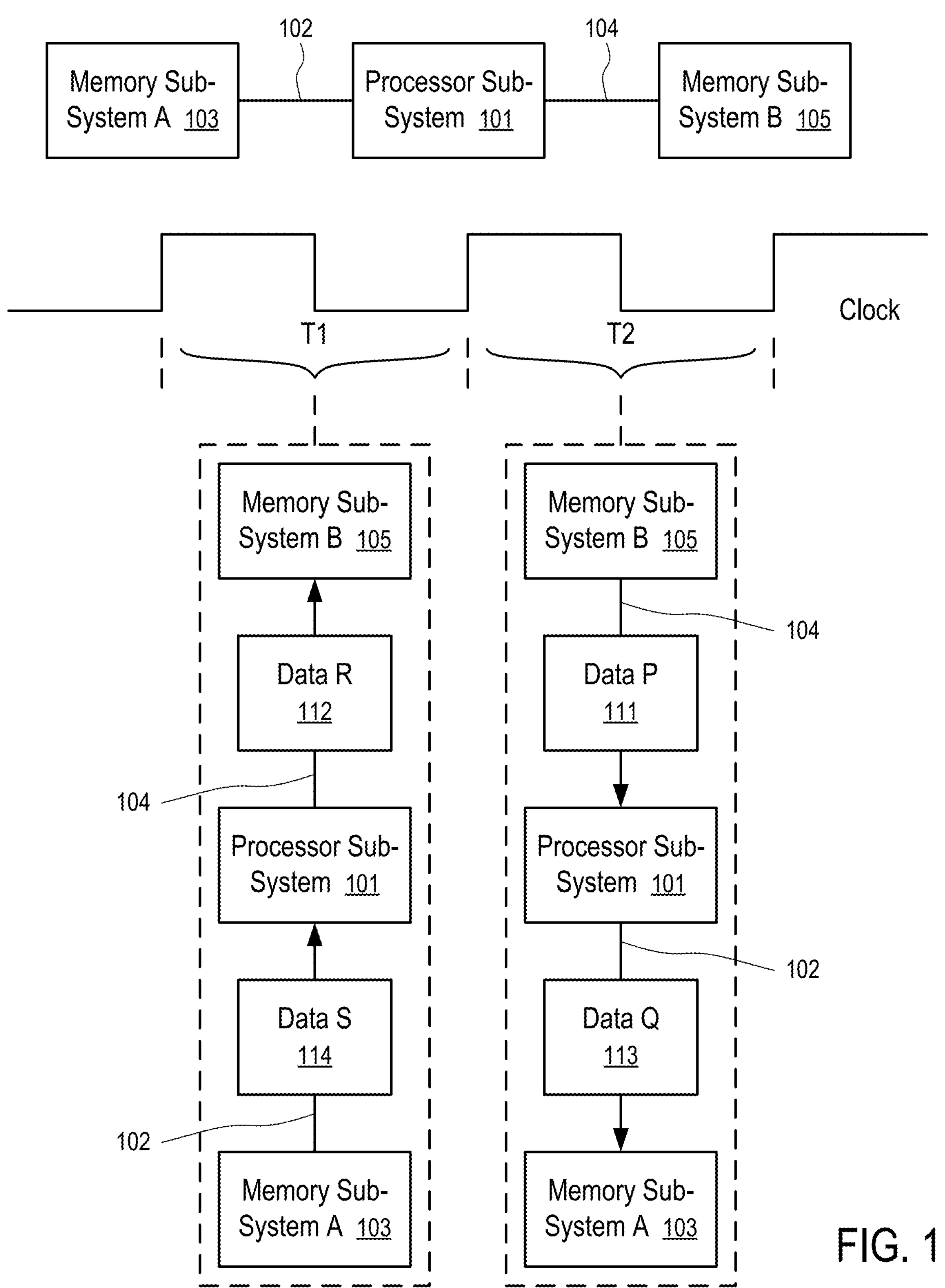
FIG. 1 shows a system configured with systolic memory access according to one embodiment.

At least some embodiments disclosed herein provide techniques of systolic memory access where data is configured to flow between two memory sub-systems through a processor sub-system in directions predetermined for clock cycles. The processor sub-system is configured to operate on the data flowing between the memory sub-systems.

Due to the increasing demands from modern processing units and applications, orchestrating data movement to and from processing elements and memory has become an important consideration to be made in system design.

At least some aspects of the present disclosure address the above and other challenges and deficiencies by the use of systolic memory access assisted by high-bandwidth, wavelength division multiplexing (WDM) based photonic bandwidths. High bandwidth photonic interconnects are configured to connect disaggregated memory and compute banks.

The systolic memory access pattern can efficiently utilize the high bandwidth offered by wavelength division multiplexing (WDM) based photonic interconnects, with minimal buffering and associated latency. The systolic flow of access and hence data also facilitates lower hardware cost. Photonic links do not support duplex communication over a same waveguide/optical fiber. A typical usual solution is to double the number of optical fibers/waveguides to facilitate duplex communications over separate waveguides/optical fibers. The systolic memory access pattern avoids such a communication pattern.

In one embodiment, two photonic interconnect-enabled memory banks are separately connected to a single bank of high performance computing elements. For example, each of the memory banks can be configured with an optical interface circuit (OIC) that provides a port for a connection to a ribbon of one or more optical fibers. The bank of computing elements can have two optical interface circuits for connections with the memory banks respectively with ribbons of optical fibers. Data is configured to flow from one memory bank toward another memory bank, through the computing element bank in one cycle; and data is configured to flow in the opposite direct in another cycle.

Such data flow techniques can be well suited for certain applications that have predictable and systematic read/write patterns. Examples of such applications include deep learning inference based on very large models (e.g., bidirectional encoder representations from transformers (BERT) with large models).

For example, a memory sub-system to implement systolic memory access can have a plurality of high bandwidth memory (HBM) devices. Each HBM device has a set of random access memories (e.g., dynamic random access memory (DRAM) chips) managed by a single memory controller. The memory controllers of the HBM devices of the memory sub-system are connected via electrical interconnects to a central optical interface circuit that can transmit or receive data over an optical fiber ribbon.

For example, the bank of processing elements can have a collection of interconnected server-scale processors. The processors can be tasked with various parts of the inference task graph, and can pass results of computation operations from one processor to next. A free processor in the bank can be fed the next set of data buffered in the optical interface circuits (e.g., next set of the data in the same batch) as soon as it is done with its assigned processing of task graphs.

For example, an optical interface circuit can be an electro-optical circuit, which includes buffering circuits and the optical transmission and reception circuits. For example, microring resonators controlled by tuning circuits can be used in transmission circuits to modulate optical signals in a waveguide to transmit data; and optical signals in microring resonators coupled to a waveguide can be measured via photodetectors in reception circuits to identify received data.

The systolic data movement allows for quick data movement from a memory bank to a processing element bank and to another memory bank. To facilitate the systolic data movement, the data involved in the operations are defined and organized for easy access via a static memory mapping scheme that can be determined through address assignments at a compiler level.

For example, the compiler can be provided with an internal mapping of the systolic memory access system along with a transaction level model (TLM) of system. Based on the transaction level model the compiler can be configured to identify the read and write latency tolerances and decide how to map and extract data for a given application using systolic data movements.

For example, a typical inference acceleration application has a predictable data footprint, which allows the compiler to determine a valid static data mapping and a read and write schedule for accessing the high bandwidth memory devices.

To map data placements, the compiler can utilize a memory virtualizer and consider the memory array as a contiguous memory space in assisting the generation of physical addresses needed across multiple high bandwidth memory (HBM) chips.

FIG. 1 shows a system configured with systolic memory access according to one embodiment.

In FIG. 1, two separate connections 102 and 104 are provided from a processor sub-system 101 to two separate memory sub-systems 103 and 105 respectively. In some predetermined or selected clock cycles (e.g., odd cycles, such as clock cycle T1), the communications over the connections 102 and 104 are configured in one direction; and in other clock cycles (e.g., even cycles, such as clock cycle T2), the communications are configured in the opposite direction. Preferably, the connections 102 and 104 are optical (e.g., via ribbons of optical fibers that are configured separate from a printed circuit board).

For example, at clock cycle T1, the connection 102 is configured to communicate data 114, retrieved from the memory sub-system 103, in the direction of from the memory sub-system 103 to the processor sub-system 101; and the connection 104 is configured to communicate data 112, to be written into the memory sub-system 105, in the direction of from the processor sub-system 101 to the memory sub-system 105. In contrast, at clock cycle T2, the connection 104 is configured to communicate data 111, retrieved from the memory sub-system 105, in the direction of from the memory sub-system 105 to the processor sub-system 101; and the connection 102 is configured to communicate data 113, to be written into the memory sub-system 103, in the direction of from the processor sub-system 101 to the memory sub-system 103.

Since the communications over a connection (e.g., 102 or 104) are in a predetermined direction at each clock cycle (e.g., T1 or T2), the lack of bi-direction communication capability over an optical link is no longer a limiting factor in the use of a computing system that uses the technique of systolic memory access.

Optionally, the processor sub-system can have a pipeline of processing elements configured to propagate two pipelines of tasks in opposite directions, in sync with the communication directions of the connections 102 and 104.

For example, input data 111 can be retrieved from the memory sub-system 105 and processed via a pipeline in the processor sub-system 101 for a number of clock cycles to generate output data that is written into the memory sub-system 103. Similarly, input data 114 can be retrieved from the memory sub-system 103 and processed via a pipeline in the processor sub-system 101 for a number of clock cycles to generate output data that is written into the memory sub-system 105.

Optionally, the propagation of data within the processor sub-system 101 can change directions. For example, the output data generated from processing the input data 111 retrieved from the memory sub-system 105 can be written back to the memory sub-system 105 after a number of clock cycles of pipeline processing within the processor sub-system 101; and the output data generated from processing the input data 114 retrieved from the memory sub-system 103 can be written back to the memory sub-system 103 after a number of clock cycles of pipeline processing within the processor sub-system 101.

Optionally, the input data retrieved from the memory sub-systems 103 and 105 can be combined via the pipeline processing in the processor sub-system 101 to generate output data to be written into one or more of the memory sub-systems 103 and 105. For example, the input data 111 and 114 can be combined in the processor sub-system 101 to generate output data that is written into the memory sub-system 105 (or memory sub-system 103) after a number of clock cycles.

FIG. 1 illustrates an example where when one connection (e.g., 102) is propagating input data toward the processor sub-system 101, the other connection (e.g., 104) is propagating output data away from the processor sub-system 101. Alternatively, when one connection (e.g., 102) is propagating input data toward the processor sub-system 101, the other connection (e.g., 104) is propagating input data into the processor sub-system 101; and thus, the memory sub-systems 103 and 105 can be read or written in unison in some clock cycles.

In general, the directions of communications over the connections 102 and 104 can be predetermined by a data movement manager. The data movement manager can allocate the directions of communications for the connections 102 to best utilize the communication bandwidth of the connections 102 and 104 for improved overall performance of the system.

Figure 2:
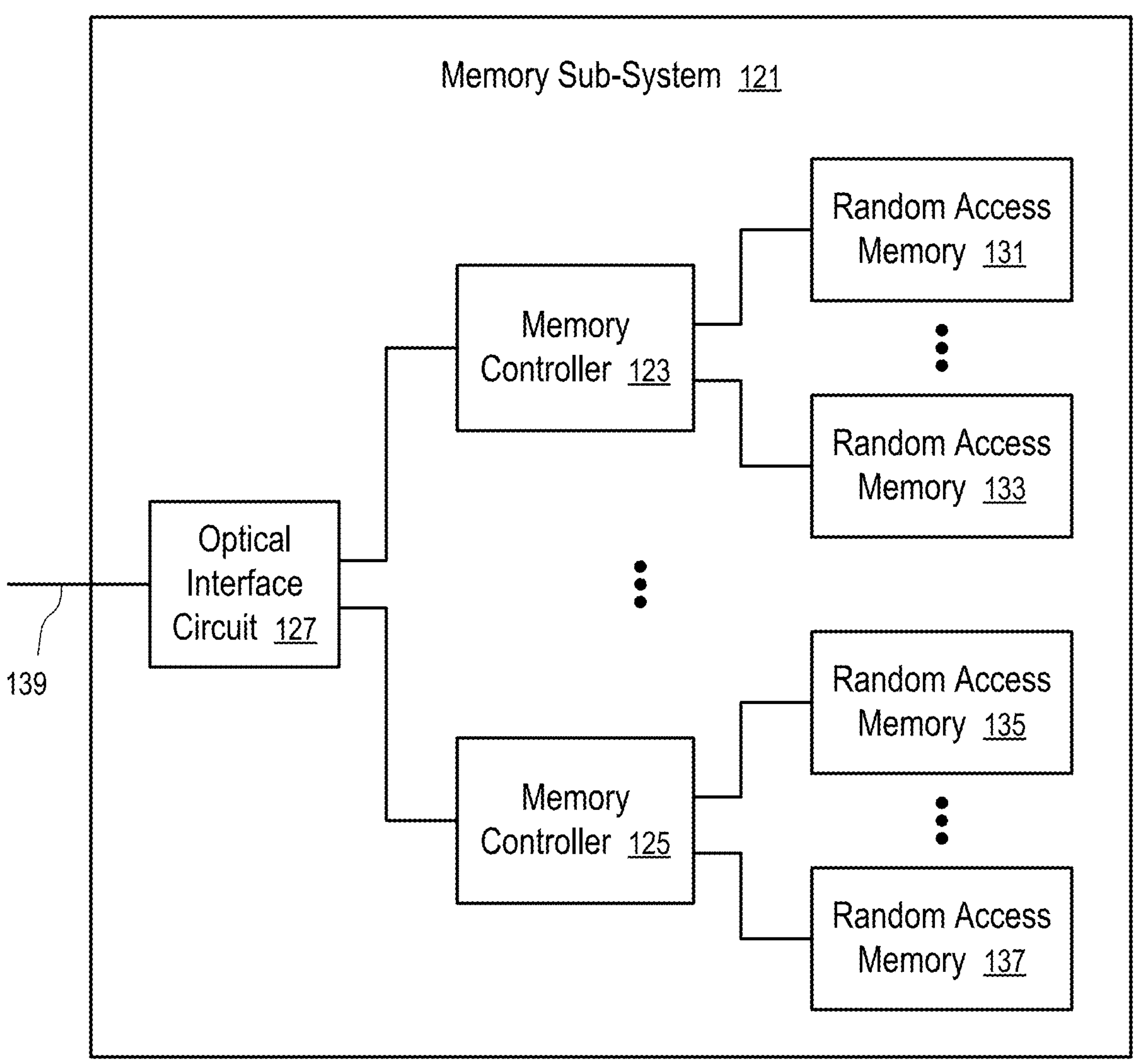
FIG. 2 shows a memory sub-system configured to facilitate systolic memory access according to one embodiment.

FIG. 2 shows a memory sub-system configured to facilitate systolic memory access according to one embodiment. For example, the memory sub-systems 103 and 105 in FIG. 1 can be implemented in a way as in FIG. 2.

In FIG. 2, the memory sub-system 121 includes an optical interface circuit 127 to transmit or receive data via a ribbon 139 of one or more optical fibers. For example, the connections 102 and 104 in FIG. 1 can be implemented using the ribbons (e.g., 139) of optical fibers when the memory sub-systems 103 and 105 and the processor sub-system 101 are configured with optical interface circuits (e.g., 127).

The optical interface circuit 127 can have one or more buffers for a plurality of memory controllers 123, . . . , 125. The memory controllers 123, . . . , 125 can operate in parallel to move data between the optical interface circuit 127 and the random access memory 131, . . . , 133; . . . ; 135, . . . , 137 controlled by the respective memory controllers 123, . . . , 125.

Optionally, a same read (or write) command can be applied to the plurality of memory controllers 123, . . . , 125. The read (or write) command specifies a memory address. Each of the memory controllers 123, . . . , 125 can execute the same command to read data from (or write data into) the same memory address in a respective memory (e.g., 131, . . . , 135) for high bandwidth memory access through the optical interface circuit 127.

Optionally, each of the random access memories (e.g., 131, . . . , 133) can have a same addressable memory address; and the memory controller 123 can operate the random access memories (e.g., 131, . . . , 133) in parallel to read or write data at the memory address across the memories (e.g., 131, . . . , 133) for improved memory access bandwidth.

Alternatively, the memory controllers 123, . . . , 125 can be controlled via different read commands (or write commands) (e.g., directed at different memory addresses).

Figure 3:
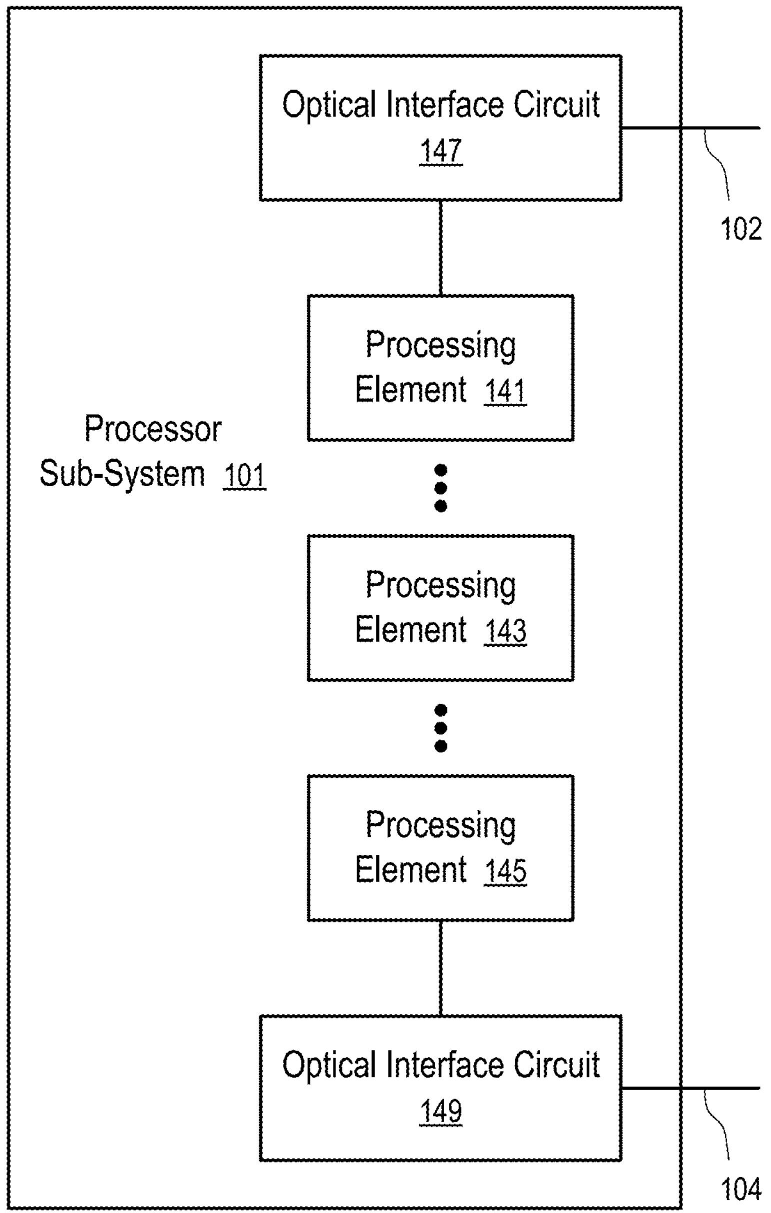
FIG. 3 shows a processor sub-system configured to facilitate systolic memory access according to one embodiment.

FIG. 3 shows a processor sub-system configured to facilitate systolic memory access according to one embodiment. For example, the processor sub-system 101 in FIG. 1 can be implemented in a way as in FIG. 3.

In FIG. 3, the processor sub-system 101 includes optical interface circuits 147 and 149 to transmit or receive data via connections 102 and 104 that can be implemented via ribbons 139 of one or more optical fibers.

The optical interface circuit 127 can have one or more buffers for a plurality of processing elements 141, . . . , 143, . . . , and 145.

The processing elements 141, . . . , 143, . . . , and 145 can be configured to form a pipeline to process input data (e.g., 114 as in FIG. 1) received over the connection 102 to generate output data (e.g., 112 in FIG. 1) on the connection 104.

Similarly, the processing elements 141, . . . , 143, . . . , and 145 can be configured to form another pipeline to process input data (e.g., 111 as in FIG. 1) received over the connection 104 to generate output data (e.g., 113 in FIG. 1) on the connection 102.

In some implementations, the processing pipelines implemented via the processing elements 141, . . . , 143, . . . , and 145 are hardwired; and the propagation of data among the processing elements 141, . . . , 143, . . . , and 145 are predetermined for the clock cycles (e.g., T1 and T2) in a way similar to the directions of communications of the connections 102 and 104.

In other implementations, the processing pipelines implemented via the processing elements 141, . . . , 143, . . . , and 145 can be programmed via a host system; and the propagation of data among the processing elements 141, . . . , 143, . . . , and 145 can be dynamically adjusted from clock cycles to clock cycles (e.g., T1 and T2) to balance the workloads of the processing elements 141, . . . , 143, . . . , and 145 and the bandwidth usages of the connections 102 and 104.

Optionally, the processing elements 141, . . . , 143, . . . , and 145 can be programmed via a host system to perform parallel operations.

Figure 4:
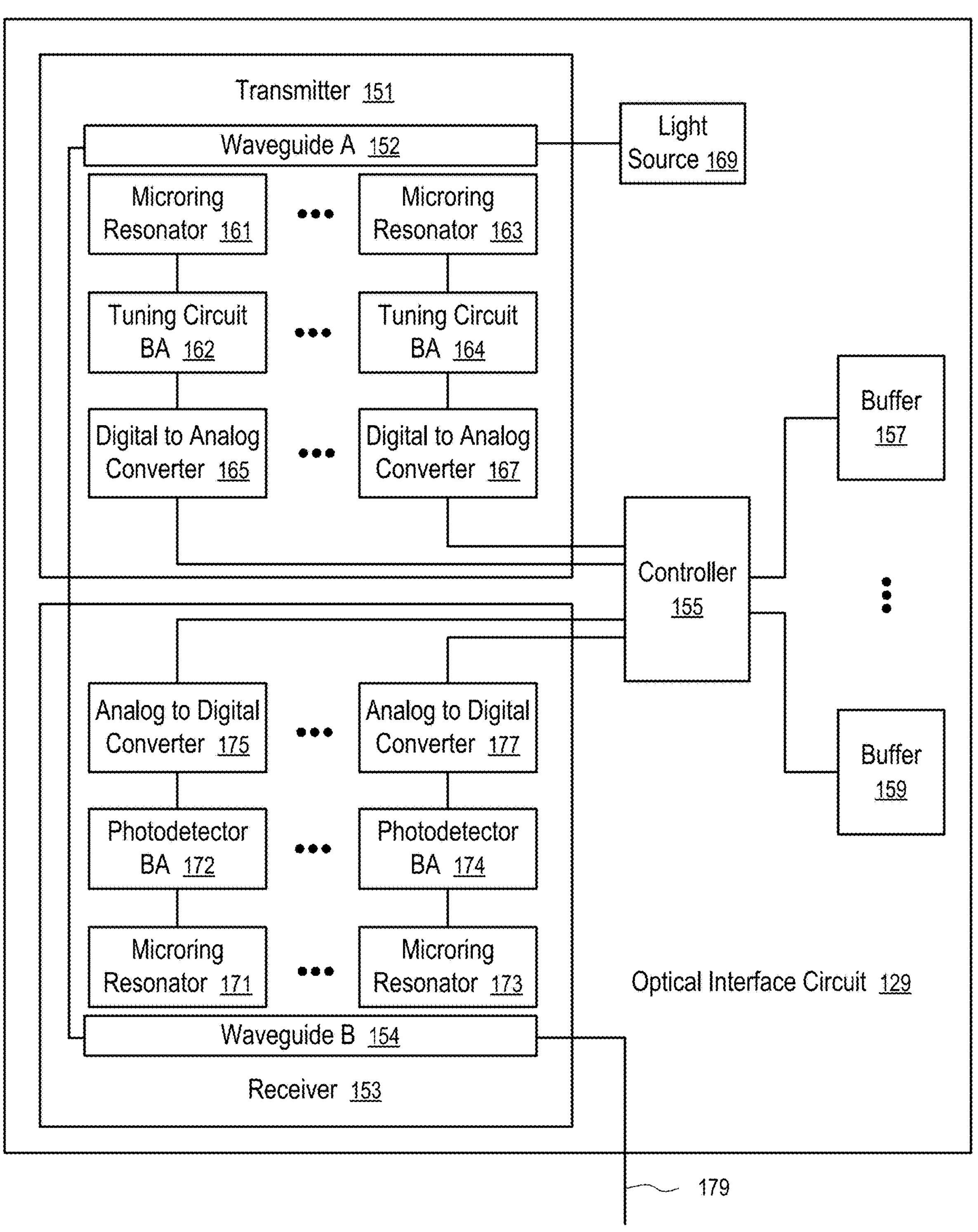
FIG. 4 shows an optical interface circuit operable in a system of systolic memory access according to one embodiment.

FIG. 4 shows an optical interface circuit operable in a system of systolic memory access according to one embodiment.

For example, the optical interface circuits 127, 147, and 149 in FIG. 2 and FIG. 3 can be implemented as in FIG. 4.

In FIG. 4, the optical interface circuit 129 includes a transmitter 151, a receiver 153, a controller 155, and one or more buffers 157, . . . , 159.

An optical fiber ribbon 179 can be connected to a waveguide 154 configured in the receiver 153, and a waveguide 152 configured in the transmitter 151. The waveguides 152 and 154 are connected to each other in the optical interface circuit 129 to provide an optical signal path between a light source 169 and the optical fiber ribbon 179.

The transmitter 151 and the receiver 153 are configured to transmit or receive data in response to the optical interface circuit 129 being in a transmission mode or a reception mode.

When the optical interface circuit 129 is in a transmission mode, the transmitter 151 is in operation to transmit data. Unmodulated optical signals from the light source 169 can propagate to the waveguide 152 in the transmitter 151 for modulation and transmission through the waveguide 154 in the receiver and the optical fiber ribbon 179. Optionally, the receiver 153 can operate when the optical interface circuit 129 is in the transmission mode to detect the optical signals modulated by the transmitter 151 for the controller 155 to verify the correct transmission of data by the transmitter 151.

When the optical interface circuit 129 is in a reception mode, the receiver 153 is in operation to receive data. Modulated optical signals propagating from the optical fiber ribbon 179 into the waveguide 154 of the receiver 153 can be detected in the receiver 153. Signals passing through the waveguides 154 and 152 can be absorbed for termination. For example, during the reception mode of the optical interface circuit 129, the light source 169 can be configured to stop outputting unmodulated optical signals and to absorb the optical signals coming from the waveguide 152. Optionally, the transmitter 151 can be configured to perform operations to attenuate the signals going through the waveguide 152 when the optical interface circuit 129 is in the reception mode.

The light source 169 can be configured as part of the optical interface circuit 129, as illustrated in FIG. 4. Alternatively, the optical interface circuit 129 can include an optical connector for connecting an external light source 169 to the waveguide 152 (e.g., in a way similar to the connection of the optical fiber ribbon 179 to the waveguide 154).

The transmitter 151 can have a plurality of microring resonators 161, . . . , 163 coupled with the waveguide 152 to modulate the optical signals passing through the waveguide 152. A microring resonator (e.g., 161 or 163) can be controlled via a respective tuning circuit (e.g., 162 or 164) to change the magnitude of the light going through the waveguide 152. A tuning circuit (e.g., 162 or 164) of a microring resonator (e.g., 161 or 163) can change resonance characteristics of the microring resonator (e.g., 161 or 163) through heat or carrier injection. Changing resonance characteristics of the microring resonator (e.g., 161 or 163) can modulate the optical signals passing through waveguide 152 in a resonance frequency/wavelength region of the microring resonator (e.g., 161 or 163). Different microring resonators 161, . . . , 163 can be configured to operate in different frequency/wavelength regions. The technique of wavelength division multiplexing (WDM) allows high bandwidth transmissions over the connection from waveguide 152 through the ribbon 179.

During the transmission mode, the controller 155 (e.g., implemented via a logic circuit) can apply data from the buffers 157, . . . , 159 to the digital to analog converters 165, . . . , 167. Analog signals generated by the digital to analog converters 165, . . . , 167 control the turning circuits 162 in changing the resonance characteristics of the microring resonators 161, . . . , 163 and thus the modulation of optical signals passing through the waveguide 152 for the transmission of the data from the buffers 157, . . . , 159.

The receiver 153 can have a plurality of microring resonators 171, . . . , 173 coupled with the waveguide 154 to detect the optical signals passing through the waveguide 154. Different microring resonators 171, . . . , 173 can be configured to operate in different frequency/wavelength regions to generate output optical signals through resonance. Photodetectors 172, . . . , 174 can measure the output signal strengths of the microring resonators 171, . . . , 173, which correspond to the magnitude-modulated optical signals received from the optical fiber ribbon 179. Analog to digital converters 175, . . . , 177 convert the analog outputs of the photodetectors 172, . . . , 174 to digital outputs; and the controller 155 can store the digital outputs of the analog to digital converters 175, . . . , 177 to the buffers 157, . . . , 159.

In some implementations, when the optical interface circuit 129 is configured for the memory sub-system 121 of FIG. 2, the optical interface circuit 129 can optionally be configured to have a plurality of buffers 157, . . . , 159 accessible, in parallel, respectively by the plurality of memory controllers 123, . . . , 125 in the memory sub-system 121 for concurrent operations (e.g., reading data from or writing data to the buffers 157, . . . , 159).

In some implementations, when the optical interface circuit 129 is configured for the processor sub-system 101 of FIG. 3, the optical interface circuit 129 can optionally be configured to have a plurality of buffers 157, . . . , 159 accessible, in parallel, respectively by a plurality of processing elements 141, . . . , 143, . . . , 145 for concurrent operations (e.g., reading data from or writing data to the buffers 157, . . . , 159).

Figure 5:
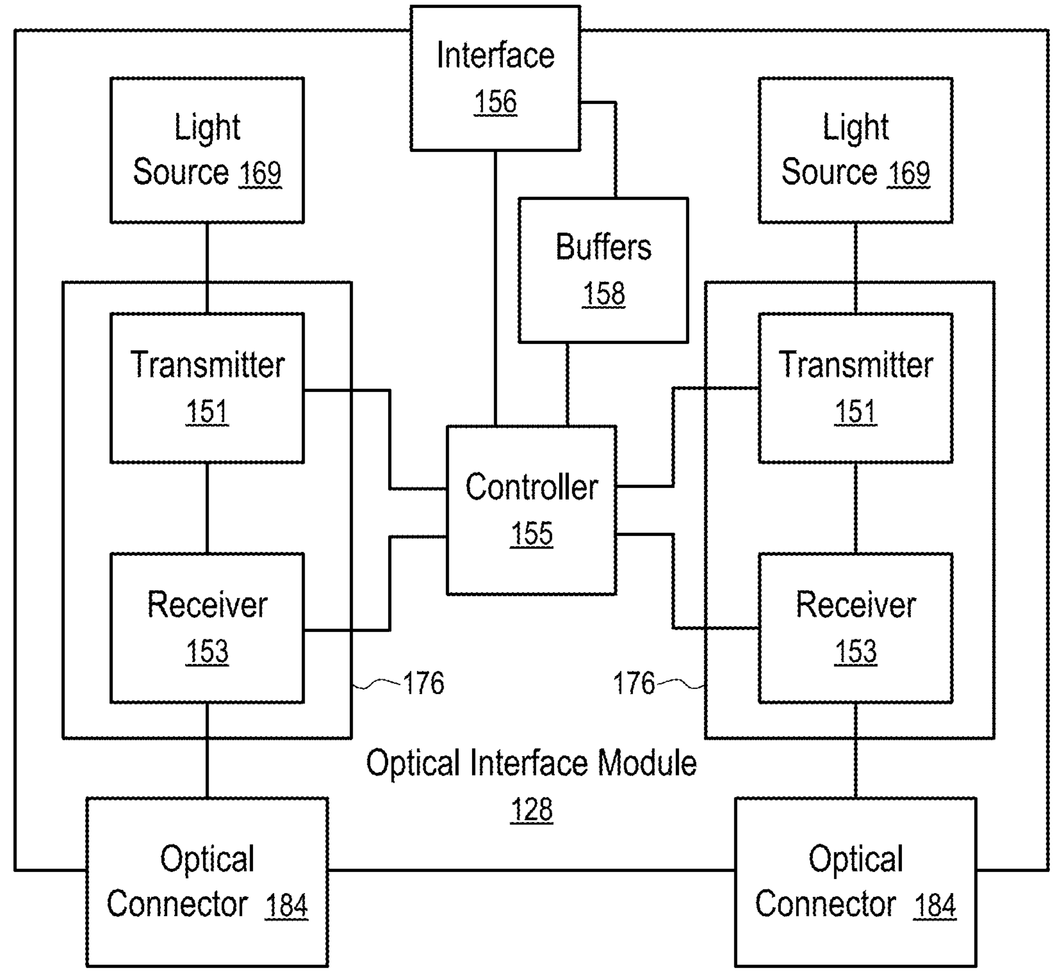
FIG. 5 shows an optical interface module according to one embodiment.

FIG. 5 shows an optical interface module 128 according to one embodiment. For example, the optical interface circuits 127, 147 and 149 in FIG. 2 and FIG. 3 can be implemented via the optical interface module 128 of FIG. 5.

In FIG. 5, the optical interface module 128 includes two sets of electro-optical circuits, each containing a light source 169, an optical transceiver 176 having a transmitter 151 and a receiver 153, and an optical connectors 184. For example, the transmitters 151 and receivers 153 of the optical interface module 128 can be implemented in a way as illustrated in FIG. 4.

Each set of the electro-optical circuits has a waveguide (e.g., including 152, 154 as in FIG. 4) that is connected from the optical connector 184 through the receiver 153 and the transmitter 151 to the light source 169, as in FIG. 4.

A controller 155 of the optical interface module 128 can control the operating mode of each set of the electro-optical circuits to either transmit data from the buffers 158 or receive data into the buffers 158, as in FIG. 4.

An electric interface 156 can be configured to operate the optical interface module 128 as a memory sub-system servicing a host system (or as a host system using the services of one or more memory sub-systems).

For example, the optical interface module 128 can be used to implement the optical interface circuits 147 and 149 of the processor sub-system 101 of FIG. 3 by using the optical connectors 184 for the connections 102 and 104 respectively. The processing elements 141, 145, and optionally other processing elements (e.g., 143) can be each implemented via a system on a chip (SoC) device having a memory controller to read data from, or write data to, the interface 156.

For example, the interface 156 can include a plurality of host interfaces for the processing elements 141 and 145 (or 141, . . . , 143, . . . , 145) respectively. The host interfaces can receive read/write commands (or load/store instructions) in parallel as if each of the host interfaces were configured for a separate memory sub-system.

The controller 155 is configured to transmit the commands/instructions and their data received in the host interfaces for transmission at least in part over the optical connectors 184.

Optionally, the optical interface module 128 further includes two electric interfaces for transmission control signals (and addresses) to the memory sub-systems (e.g., 103 and 105) that are connected to the optical connectors 184 respectively.

To enable systolic memory access, the optical interface module 128 can be configured to place the two sets of electro-optical circuits in opposite modes. For example, when one optical connector 184 is used by its connected receiver 153 for receiving data, the other set of electro-optical circuit can be automatically configured by the controller 155 in a transmission mode; and when one optical connector 184 is used by its connected transmitter 151 for transmitting data, the other set of electro-optical circuit can be automatically configured by the controller 155 in a reception mode.

In another example, the optical interface module 128 can be used to implement the optical interface circuit 127 of the memory sub-system 121 of FIG. 2 by attaching one of the optical connectors 184 to the ribbon 139 of one or more optical fibers. Optionally, the other optical connector 184 of the optical interface module 128 can be connected to another ribbon that is in turn connected to another processor sub-system (e.g., similar to the connection to the processor sub-system 101 in FIG. 1). Thus, the memory sub-system 121 can be chained between two processor sub-systems (e.g., 101); and the chain of memory sub-systems to processor sub-systems can be extended to include multiple processor sub-systems and multiple memory sub-systems, where each processor sub-system is sandwiched between two memory sub-systems. Optionally, the chain can be configured a closed loop, where each memory sub-system is also sandwiched between two processor sub-system 101.

Optionally, when used in a memory sub-system 121, the interface 156 can include a plurality of memory interfaces. Each of the memory interfaces can operate as a host system to control a memory controller (e.g., 123 or 125) by sending read/write commands (or store/load instructions) to the memory controller (e.g., 123 or 125). Thus, each of the memory controllers (e.g., 123) and its random memory (e.g., 131, . . . , 133) in the memory sub-system 121 can be replaced with, or be implemented using, a conventional memory sub-system, such a solid state drive, a memory module, etc.

Alternatively, when used in a memory sub-system 121, the interface 156 can be simplified as connections for the memory controllers 123, . . . , 125 to directly access respective buffers 158 (e.g., 157, . . . , 159) in the optical interface module 128.

FIG. 6 shows a configuration to connect a memory sub-system and a processor sub-system according to one embodiment. For example, the connection 102 between the memory sub-system 103 and the processor sub-system 101 in FIG. 1 can be implemented using the configuration of FIG. 6. For example, the connection 104 between the memory sub-system 105 and the processor sub-system 101 in FIG. 1 can be implemented using the configuration of FIG. 6.

In FIG. 6, a memory sub-system (e.g., 103 or 105) can be enclosed in an integrated circuit package 195; and a processor sub-system 101 can be enclosed in another integrated circuit package 197.

Within the integrated circuit package 195, the memory sub-system (e.g., 103, 105, or 121) includes an interposer 186 configured to provide an optical connector 184 to an optical fiber 183 (e.g., ribbon 139 or 179). Data to be transmitted to, or received in, the buffers (e.g., 157, . . . , 159) of an optical interface circuit 129 of the memory sub-system is configured to be communicated through the optical fiber 183 over the optical connector 184. Control signals and power are configured to be connected to the memory sub-system via traces 182 configured on the printed circuit board 181. The optical fiber 183 can be configured in a ribbon that is separate from the printed circuit board 181.

Similarly, within the integrated circuit package 197, the processor sub-system (e.g., 101) includes an interposer 188 configured to provide an optical connector 185 to the optical fiber 183 (e.g., ribbon 179). Data to be transmitted to, or received in, the buffers (e.g., 157, . . . , 159) of an optical interface circuit 129 of the processor sub-system is configured to be communicated through the optical fiber 183 over the optical connector 185. Control signals and power are configured to be connected to the processor sub-system via traces 182 configured on the printed circuit board 181. The optical fiber 183 can be configured in a ribbon that is separate from the printed circuit board 181.

In FIG. 6, both the package 195 of the memory sub-system and the package 197 of the processor sub-system are mounted on a same printed circuit board 181 that has traces 182 configured to route signals for control (e.g., clock) and power.

The communications over the optical fiber 183 can be at a clock frequency that is multiple times of the frequency of the clock signals (e.g., times T1 and T2 in FIG. 1) transmitted over the traces 182 and used to control the communication directions in the optical fiber 183.

Each of the memory sub-system enclosed within the package 195 and the processor sub-system enclosed within the package 197 can include an optical interface circuit (e.g., 129) to bridge the optical signals in the optical fiber 183 and electrical signals in the memory/processor sub-system.

Control signals and power can be connected via traces 182 through a ball grid array 187 (or another integrated circuit chip mounting technique) and the interposer 186 to the controller 155 of the optical interface circuit 129 of the memory sub-system and the memory controllers (e.g., 192) in the memory sub-system. The memory sub-system can have one or more memory dies 193 stacked on a logic die in which the memory controllers (e.g., 192) are formed.

Similarly, control signals and power can be connected via traces 182 through a ball grid array 189 (or another integrated circuit chip mounting technique) and the interposer 188 to the controller 155 of the optical interface circuit 129 of the processor sub-system and the logic die 191 of the processor sub-system.

FIG. 7 shows a configuration to connect memory sub-systems and a processor sub-system for systolic memory access according to one embodiment. For example, the memory sub-systems 103 and 105 and the processor sub-system 101 in FIG. 1 can be connected in a configuration of FIG. 7.

In FIG. 7, the memory sub-systems 103 and 105 and the processor sub-system 101 are mounted on a same printed circuit board 181 for control and power. For examples, the memory sub-systems 103 and 105 and the processor sub-system 101 can be each enclosed within a single integrated circuit package and connected to the traces 182 on the printed circuit board 181 via a respective ball grid arrays (e.g., 187, 198, or 198), as in FIG. 6. Alternative techniques for mounting integrated circuit chip on printed circuit boards can also be used.

The traces 182 on the printed circuit board 181 can be used to connect signals (e.g., clock) and power that do not require a high communication bandwidth to the memory sub-systems 103 and 105 and the processor sub-system 101. Ribbons of optical fibers 194 and 196 can be used to connect data, address, and/or command communications between the processor sub-system 101 and the memory sub-systems 103 and 105.

For example, the memory sub-system 103 and the processor sub-system 101 can be connected in a way as illustrated in FIG. 6; and the memory sub-system 105 and the processor sub-system 101 can be connected in a way as illustrated in FIG. 6. The interposer 188 in the processor sub-system 101 can have two optical connectors (e.g., 185): one connected to the optical fiber 194, and the other to the optical fiber 196.

In some implementations, the communication directions in the optical fibers (e.g., 194 and 196) are predetermined for clock cycles.

For example, in odd numbered clock cycles, the optical interface circuit 129 in the memory sub-system 103 is in a transmission mode; and the optical interface circuit 129 in the processor sub-system 101 and connected to the optical fiber 194 is in a reception mode. Thus, the data transmission in the optical fiber 194 is from the memory sub-system 103 toward the processor sub-system 101. Similarly, in even numbered clock cycles, the optical interface circuit 129 in the memory sub-system 103 is in a reception mode; and the optical interface circuit 129 in the processor sub-system 101 and connected to the optical fiber 194 is in a transmission mode. Thus, the data transmission in the optical fiber 194 is from the processor sub-system 101 toward the memory sub-system 103 toward.

Alternatively, a processor sub-system 101 (or a host system) can use a control signal transmitted over the traces 182 to control the direction of transmission over the optical fiber 194. For example, when a first signal (separate from a clock signal) is sent over the traces 182 to the memory sub-system 103 (e.g., from the processor sub-system 101 or the host system), the optical interface circuit 129 in the memory sub-system 103 is in a transmission mode; and the processor sub-system 101 can receive data from the memory sub-system 103 over the optical fiber 194. When a second signal (separate from a clock signal and different from the first signal) is sent over the traces 182 to the memory sub-system 103 (e.g., from the processor sub-system 101 or the host system), the optical interface circuit 129 in the memory sub-system 103 is in a reception mode; and the processor sub-system 101 can transmit data to the memory sub-system 103 over the optical fiber 194. Thus, the data transmission direction over the optical fiber 194 (or 196) can be dynamically adjusted based on the communication needs of the system.

Data transmitted from the processor sub-system 101 to a memory sub-system 103 (or 105) over an optical fiber 194 (or 196) can include outputs generated by the processor sub-system 101. Optionally, data retrieved from one memory sub-system (e.g., 105) can be moved via the processor sub-system 101 to another memory sub-system (e.g., 103) via an optical fiber (e.g., 194).

Further, data transmitted from the processor sub-system 101 to a memory sub-system 103 (or 105) over an optical fiber 194 can include commands (e.g., read commands, write commands) to be executed in the memory sub-system 103 (or 105) and parameters of the commands (e.g., addresses for read or write operations). Alternatively, the commands can be transmitted via the traces 182, especially when the sizes of the commands (and their parameters) are small, compared to the data to be written into the memory sub-system 103 (or 105). For example, when the memory controllers 123, . . . , 125 can share a same command and an address for their operations in accessing their random access memories (e.g., 131, . . . , 133; or 135, . . . , 137), the size of the command and the address can be smaller when compared to the size of the data to be written or read via the command.

Data transmitted to the processor sub-system 101 from a memory sub-system 103 (or 105) over an optical fiber 194 can include data retrieved from the random access memories

131, . . . , 133, . . . , 135, . . . , 137 in response to read commands from the processor sub-system 101.

The interposers (e.g., 186) of the memory sub-systems 103 and the processor sub-system 101 can be implemented using the technique of FIG. 8 or FIG. 9.

FIG. 8 and FIG. 9 show techniques to connect a logic die to a printed circuit board and an optical fiber according to one embodiment.

In FIG. 8, an active interposer 186 is configured on an integrated circuit die to include active circuit elements of an optical interface circuit 129, such as the transmitter 151 and receiver 153, in addition to the wiring to directly connect the ball grid array 187 to the microbumps 178. The active interposer 186 includes the optical connector 184 for a connection to an optical fiber ribbon 179. Optionally, the active interposer 186 further includes the controller 155 and/or the buffers 157, . . . , 159 of the optical interface circuit 129. Alternatively, the controller 155 can be formed on a logic die 199. For example, when the active interposer 186 is used in a processor sub-system 101, the logic die 199 can contain the logic circuits (e.g., processing elements 141, . . . , 143, . . . , or 145) of the processor sub-system 101. For example, when the active interposer 186 is used in a memory sub-system 121, the logic die 199 can contain the logic circuits (e.g., memory controllers 123, . . . , 125) of the memory sub-system 121.

The active interposer 186 is further configured to provide wires for the control and power lines to be connected via the ball grid array 187 through microbumps 178 to the circuitry in the logic die 199.

For example, the active optical interposer 186 can include waveguides 152 and 154, microring resonators 171, . . . , 173 and 161, . . . , 163, digital to analog converters 165, . . . , 167, tuning circuits 162, . . . , 164, analog to digital converters 175, . . . , 177, photodetectors 172, 174, wire connections via a ball grid array 187 toward traces 182 on a printed circuit board 181, wire connections via microbumps 178 to one or more logic dies 199 (and memory dies 193), wires routed between the wire connections, and a port or connector 184 to an optical fiber (e.g., 183, 194, or 196).

In contrast, FIG. 9 shows a passive interposer 186 configured between a printed circuit board 181 and integrated circuit dies, such as a logic die 199 and a die hosting an optical interface circuit 129 and a port or connection 184 to an optical fiber (e.g., 183, 194, or 196). The passive interposer 186 contains no active elements and is configured to provide wire connections between the circuitry in the logic die 199 and the circuitry in the optical interface circuit 129, and wire connections to the traces 182 on the printed circuit board 181.

In some implementations, an optical interface module 128 is configured as a computer component manufactured on an integrated circuit die. The optical interface module 128 includes the optical interface circuit 129 formed on a single integrated circuit die, including at least one optical connector 184 and optionally, a light source 169 for the transmitter 151. Optionally, the optical interface module 128 includes the wires and connections of the active interposer 186 that are not directly connected to the optical interface circuit 129. Alternatively, the optical interface module 128 is configured to be connected to other components of a memory sub-system (e.g., 121) (or a processor sub-system (e.g., 101)) via a passive interposer 186, as in FIG. 9.

In one embodiment, an optical interface module 128 is configured to provide access, via an optical fiber 183, multiple sets of memories (e.g., 131, . . . , 133; . . . , 135, . . . , 137), each having a separate memory controller (e.g., 123, or 125). The multiple sets of memories (e.g., 131, . . . , 133; . . . , 135, . . . , 137) and their memory controllers (e.g., 123, . . . , 125) can be configured to be enclosed within multiple integrated circuit packages to form multiple memory chips. Each of the integrated circuit packages is configured to enclose a set of memories (e.g., 131, . . . , 133) formed on one or more memory dies 193 and to enclose a memory controller 192 formed on a logic die (e.g., 199) (or a portion of the memory dies 193). Optionally, the optical interface module 128 can be configured as a host of the memory chips, each enclosed within an integrated circuit package. The optical interface module 128 can write data received from the optical fiber 183 into the memory chips during one clock cycle, and transmit data retrieved from the memory chips into the optical fiber 183 during another clock cycle. Each of the memory chips can operate independent from other memory chips. Optionally, each of the memory chips can be replaced with a memory sub-system. The optical interface module 128 can be configured to optionally access the memory chips or memory sub-systems in parallel for improved memory throughput. For example, a memory sub-system 103 or 105 in FIG. 1 and FIG. 7 can be implemented with the combination of the memory chips (or memory sub-systems) controlled by an optical interface module 128 functioning as a host system of the memory chips (or memory sub-systems) for an increased memory capacity and an increased access bandwidth.

Figure 10:
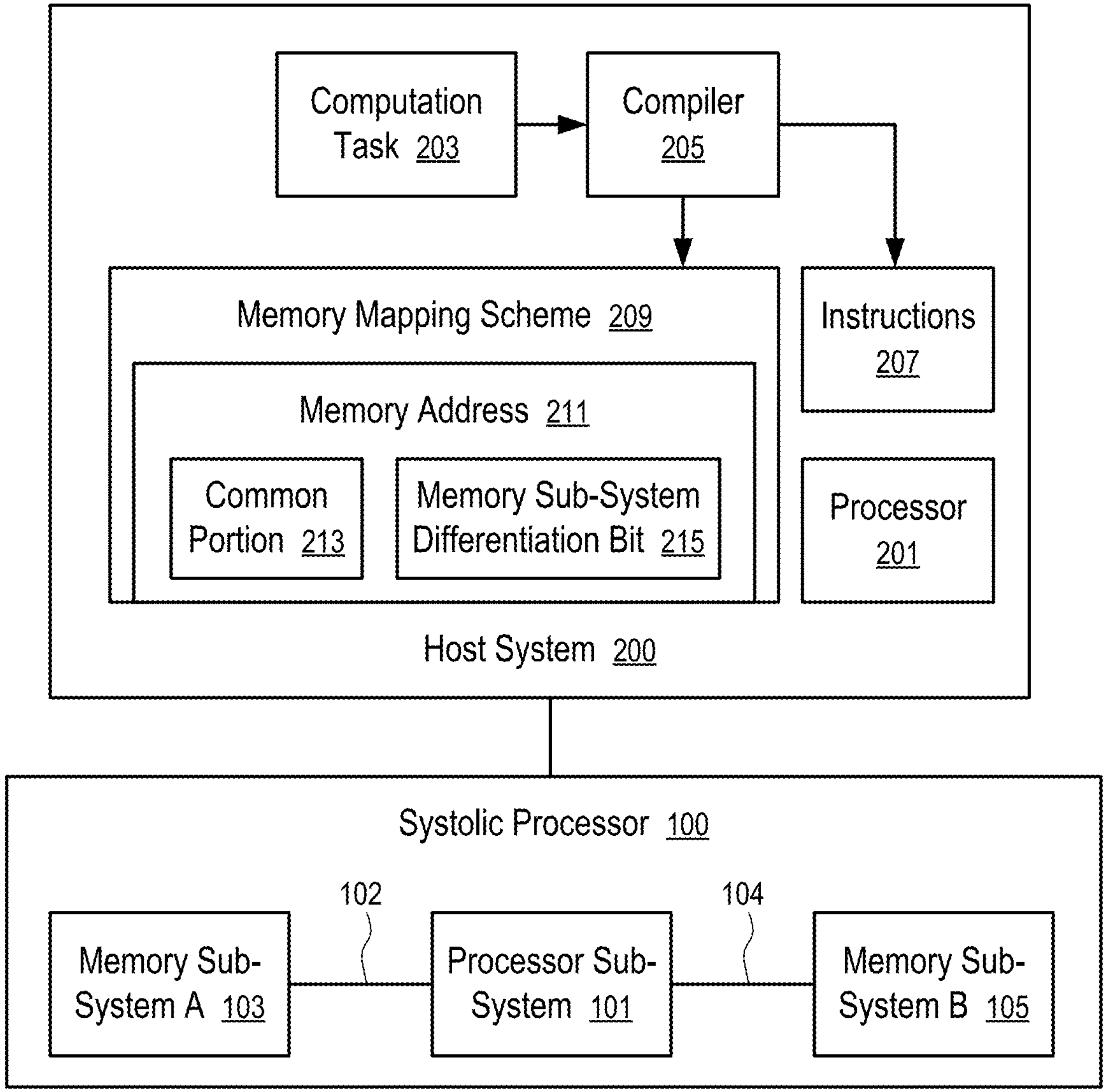
FIG. 10 shows a technique to use a compiler to configure the operations of systolic memory access according to one embodiment.

To best utilize the high memory access bandwidth offered by the memory sub-systems 103 and 105 over optical fibers 194 and 196, a memory manager can be configured to generate a memory mapping scheme with corresponding instructions for the processor sub-system 101, as in FIG. 10.

FIG. 10 shows a technique to use a compiler to configure the operations of systolic memory access according to one embodiment.

For example, the technique of FIG. 10 can be used to control the operations of a processor sub-system 101 to access memory sub-systems 103 and 105 of FIG. 1 and FIG. 7.

In FIG. 10, a systolic processor 100 includes a processor sub-system 101 connected to separate memory sub-systems 103 and 105, as in FIG. 1 and FIG. 7. A host system 200 can control the memory access pattern in the systolic processor 100.

For example, a compiler 205 can be configured as a memory manager running in the host system 200 to schedule the data and workload flow in the hardware of the systolic processor 100 to best utilize the hardware capability. The compiler 205 can be configured to generate a static memory mapping scheme 209 for a given computation task 203. The compiler 205 can be configured to try different approaches of using the memory provided by the memory sub-systems 103 and 105, and schedule the read/write commands to meet various timing requirements, such as the latency requirements of the memory sub-systems 103 and 105 in performing the read/write operations, and data usage and processing timing requirements of processors/processing elements 141, . . . , 143, . . . , 145 in the processor sub-system 101, etc. The compiler 205 can select a best performing solution to control the activities of the processor sub-system 101.

The computation task 203 can be programmed in a way where memory resources are considered to be in a same virtual memory system. The compiler 205 is configured to map the memory resources in the same virtual memory system into the two memory sub-systems 103 and 105 via a memory mapping scheme 209. A memory address in the virtual memory system can be used as the common portion 213 of a memory address 211 used to address the memory sub-systems 103 or 105. A memory sub-system differentiation bit 215 is included in the memory address 211 to indicate whether the memory address 211 is in the memory sub-system 103 or in the memory sub-system 105.

For example, when the memory sub-system differentiation bit 215 has the value of zero (0), the memory address 211 is in the memory sub-system 103. The processor sub-system 101 can provide the common portion 213 of the memory address 211 to read or write in the memory sub-system 103 at a corresponding location represented by the common portion 213 of the memory address 211.

When the memory sub-system differentiation bit 215 has the value of one (1), the memory address 211 is in the memory sub-system 105. The processor sub-system 101 can provide the common portion 213 of the memory address 211 to read or write in the memory sub-system 105 at a corresponding location represented by the common portion 213 of the memory address 211.

The common portion 213 of the memory address 211 can be programmed in, or mapped from a virtual memory address specified in, the computation task 203. The compiler 205 can determine the memory sub-system differentiation bit 215 to map the address 211 to either the memory sub-system 103 or the memory sub-system 105. The processor sub-system 101 can execute the instructions 207 of the computation task 203 to access the memory sub-system 103 or the memory sub-system 105 according to the differentiation bit 215.

Optionally, the differentiation bit 215 of some memory addresses (e.g., 211) can be computed by the processor sub-system 101 in execution of the instructions 207 configured by the compiler 205 to best utilize the memory access bandwidth offered by the connections 102 and 104.

In one implementations, a memory location in the memory sub-system 103 can have a same physical address, represented by the common portion 213, as a corresponding memory location in the memory sub-system 105. To differentiate between the two memory locations in the memory sub-systems 103 and 105 respectively, the systolic processor 100 can be configured to use an additional differentiation bit 215 based on the commands generated by compute nodes, such as system on a chip (SoC) devices in the processor sub-system 101. The compute nodes (e.g., SoC devices) can generate memory addresses (e.g., 211) with this separate/additional differentiation bit (e.g., 215) to indicate whether a memory operation is to be in the memory sub-system 103 or 105. A controller (e.g., 155) in the processor sub-system 101 consumes the differentiation bit 215 to direct the corresponding operation to either the memory sub-system 103 or 105 with the remaining bits of memory addresses (e.g., common portion 213) being provided by the processor sub-system 101 to address a memory location in the memory sub-system 103 or 105.

The compiler 205 can be configured with an internal mapping of the hardware of the systolic processor 100 and a transaction level model (TLM) of the hardware. The compiler 205 can determine, for the given computation task 203, the read and write latency tolerances and decide how to map and extract data using systolic data movements. When a memory sub-system 103 or 105 is implemented via multiple, separate memory chips (or sub-systems), memory virtualizer can be used to view the memory capacity of a collection of memory chips (or sub-systems) as a contiguous memory block to assist in generating the physical addresses used in the static memory mapping scheme 209.

Optionally, the compiler 205 can be configured to instruct the systolic processor 100 to read from one memory sub-system (e.g., 103) and then write to another (e.g., 105).

For example, in an application configured to the process of the training of an artificial neural network model, the neuron weights can be initially stored in a memory sub-system (e.g., 103); and the updated neuron weights computed by the processor sub-system 101 can be written to the corresponding locations in the other memory sub-system (e.g., 105). Subsequently, the roles of the memory sub-systems 103 and 105 can be reversed for the flowing of weight data in the opposite direction.

The differentiation bit 215 configured for controlling the selection of a memory sub-system (e.g., 103 or 105) can be used by a controller 155 of the optical interface circuits 129 of the processor sub-system 101 to select the memory sub-system (e.g., 103 or 105) currently being addressed. For example, registers (or using scratch pad memory) in the controller 155 of the optical interface module 128 of the processor sub-system 101 can be configured to identify the currently selected memory sub-system (e.g., 103 or 105) for write or read by the processor sub-system 101. For example, a bit value of zero (0) can be used to indicate that the memory sub-system 103 is to be read from, while the memory sub-system 105 is to be written into; alternatively, a bit value of one (1) can be used to indicate writing to the memory sub-system 105 while reading from memory sub-system 103. Such a register can be masked on to an outbound read/write request enabling the routing/selection of the correct memory destination. The system does not require changes to the memory controllers in the system on a chip (SoC) devices of the processor sub-system 101, but relies on the controller 155 of the optical interface circuits 129 of the processor sub-system 101.

In some implementations, the processor 201 can be configured to send signals through the traces 182 in the printed circuit board 181 (e.g., as in FIG. 7) of the systolic processor 100 to control the communication directions in the connections 102 and 104.

Figure 11:
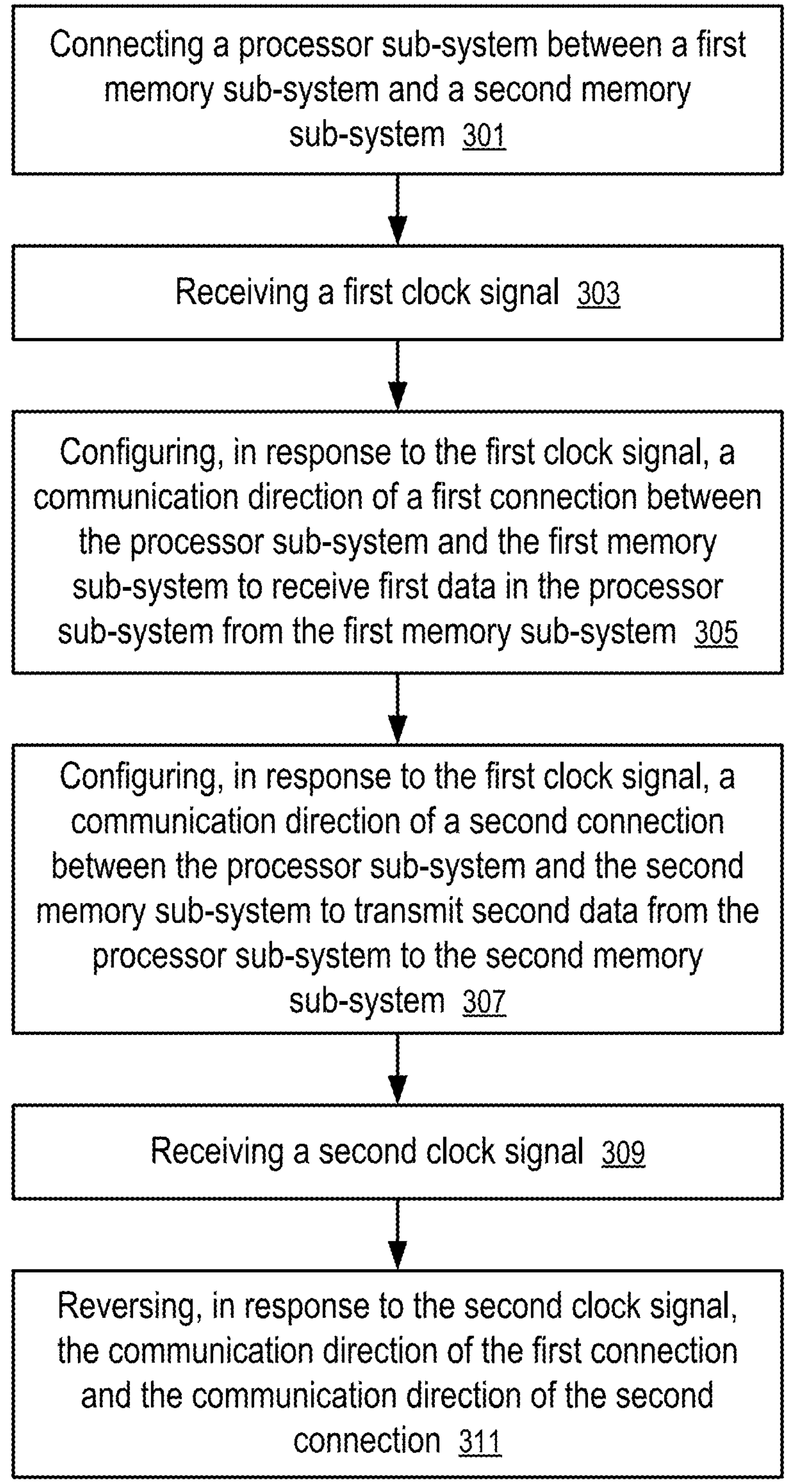
FIG. 11 shows a method of systolic memory access according to one embodiment.

FIG. 11 shows a method of systolic memory access according to one embodiment.

For example, the method of FIG. 11 can be implemented in a computing system of FIG. 10, where the systolic processor 100 can be configured on a printed circuit board 181 in a configuration illustrated in FIG. 7.

At block 301, the method includes connecting a processor sub-system 101 between a first memory sub-system 103 and a second memory sub-system 105.

At block 303, the method includes receiving a first clock signal (e.g., identifying a time period T1).

At block 305, the method includes configuring, in response to the first clock signal, a communication direction of a first connection 102 between the processor sub-system 101 and the first memory sub-system 103 to receive first data 114 in the processor sub-system 101 from the first memory sub-system 103.

For example, the first data 114 can include data retrieved from the first memory sub-system 103 after execution of read commands (e.g., transmitted to the first memory sub-system 103 in a time period identified by a previous clock signal).

At block 307, the method includes configuring, in response to the first clock signal, a communication direction of a second connection 104 between the processor sub-system 101 and the second memory sub-system 105 to transmit second data 112 from the processor sub-system 101 to the second memory sub-system 105.

For example, the second data 112 can include data to be written via execution of write commands in the second memory sub-system 105.

Optionally, the second data 112 can include data representative of read commands to retrieve data from the second memory sub-system 105. For example, after the execution of the read commands, the retrieved data can be communicated from the second memory sub-system 105 to the processor sub-system 101 after the communication direction in the connection 104 is reversed in response to a subsequent clock signal.

Optionally, the second data 112 can include data representative of addresses for execution of read commands and/or write commands in the second memory sub-system.

At block 309, the method includes receiving a second clock signal (e.g., identifying a time period T2).

At block 311, the method includes reversing, in response to the second clock signal, the communication direction of the first connection 102 and the communication direction of the second connection 104.

For example, the reversing can be predetermined for the second clock signal being an odd-number clock signal (or an even-number clock signal) transmitted on traces 182 on a printed circuit board 181.

For example, the first connection 102 and the second connection 104 are implemented via optical fibers 194 and 196 configured in ribbons that separate from the printed circuit board 181.

For example, the processor sub-system 101, the first memory sub-system 103, and the second memory sub-system 105 are mounted on a same printed circuit board 181.

For example, the first clock signal and the second clock signal are provided to the processor sub-system 101, the first memory sub-system 103, and the second memory sub-system 105 via traces 182 on the printed circuit board 181.

Optionally, the method can include: transmitting a read command using the traces 182 on the printed circuit board 181 to receive the first data from the first memory sub-system 103; and transmitting a write command using the traces 182 on the printed circuit board 181 to write the second data 112 into the second memory sub-system 105.

Optionally, the method can include: transmitting a first address using the traces 182 on the printed circuit board 181 to receive the first data from the first memory sub-system 103; and transmitting a second address using the traces 182 on the printed circuit board 181 to write the second data 112 into the second memory sub-system 105.

For example, the first memory sub-system 103, the second memory sub-system 105 and the processor sub-system 101 can each be implemented via a device having: one or more buffers (e.g., 158; or 157, . . . , 159); an optical receiver 153; an optical transmitter 151; and an optical connector 184. The optical connector 184 is operable to an optical fiber (e.g., 194 or 196) to the optical transmitter 151 through the optical receiver 153. The device can further include a controller 155 coupled to the one or more buffers (e.g., 158; or 157, . . . , 159) and configured to operate a combination of the optical receiver 153 and the optical transmitter 151 in either a transmission mode or a reception mode.

For example, the optical transmitter 151 is configured to modulate optical signals coming from a light source 169 toward the optical connector 184 in the transmission mode; and the optical receiver 154 is configured to detect optical signals propagating from the optical connector 184 toward the optical transmitter 151 in the reception mode.

Optionally, the optical receiver 153 is configured to detect optical signals coming from the optical transmitter 151 toward the optical connector 184 in the transmission mode; and the controller 155 is configured to detect transmission errors based on signals detected by the optical receiver 153 when the combination of the receiver 153 and the transmitter 151 is in the transmission mode.

Optionally, the optical transmitter is configured to attenuate optical signals passing through the optical transmitter 151 when the combination of the receiver 153 and the transmitter 151 in the reception mode.

For example, the device can include: a logic die 199 containing the controller 155; and an active interposer 186 containing the optical receiver 153, the optical transmitter 151, the optical connector 184, and wires configured to connect a ball grid array 187 to the logic die 199. The wires can go through the active interposer 186 without being connected to any of the optical receiver 153, and the optical transmitter 151.

Alternatively, the active interposer 186 can include the logic circuits of the controller 155 and optionally, the buffers (e.g., 157, . . . , 159; 158).

In some implementations, a non-transitory computer storage medium is configured to store instructions which, when executed in a computing device (e.g., as in FIG. 10), cause the computing device to perform a method, including compiling a program of a computation task 203 based on a transaction level model of a systolic processor 100 having the processor sub-system 101 connected to at least two separate memory sub-systems, such as the first memory sub-system 103 and the second memory sub-system 105. The method can further include: mapping, based on the compiling, memory addresses in the program of the computation task 203 to the two memory sub-systems 103 and 105; and generating instructions for the systolic processor 100 to read from the first memory sub-system 103 and write to the second memory sub-system 105 in a first set of predetermined clock cycles (e.g., T1, or odd-numbered clock cycles), and to write to the first memory sub-system 103 and read from the second memory sub-system 105 in a second set of predetermined clock cycles (e.g., T2, or even-numbered clock cycles). The first set of predetermined clock cycles and the second set of predetermined clock cycles are mutually exclusive.

Optionally, the method can further include: adding a memory sub-system differentiation bit 215 to a memory address (e.g., common portion 213) in the program of the computation task 203. When the memory sub-system differentiation bit 215 has a first value (e.g., zero), the memory address (e.g., common portion 213) is in the first memory sub-system 103. When the memory sub-system differentiation bit 215 has a second value (e.g., one), the memory address (e.g., common portion 213) is in the second memory sub-system 105. The systolic processor 100 can access either the first memory sub-system 103, or the second memory sub-system 105, according to the memory address (e.g., common portion 213) based on the value of the memory sub-system differentiation bit 215.

Optionally, the compiler 205 can configure instructions 207 to be executed by the processor sub-system 101 to generate the memory sub-system differentiation bit 215 for a memory address (e.g., common portion 213) used to access memory. When the memory sub-system differentiation bit 215 has a first value (e.g., zero), the memory address (e.g., common portion 213) is accessed by the processor sub-system 101 in the first memory sub-system 103; and when the memory sub-system differentiation bit 215 has a second value (e.g., one), the memory address (e.g., common portion

213) is accessed by the processor sub-system 101 in the second memory sub-system 105.

For example, memory access requests can be buffered in an optical interface module 128 of the processor sub-system 101 for communication with the memory sub-system 103 and 105 based on the timing of the communication directions of the connections 102 and 104, and the memory sub-system differentiation bit 215 attached to a memory address (e.g., common portion 213) that is accessible in both memory sub-systems 103 and 105.

In general, a memory sub-system can be configured as a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The memory sub-system can be installed in a computing system to accelerate multiplication and accumulation applied to data stored in the memory sub-system. Such a computing system can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

In general, a computing system can include a host system that is coupled to one or more memory sub-systems. In one example, a host system is coupled to one memory sub-system. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system can include a processor chipset (e.g., processing device) and a software stack executed by the processor chipset. The processor chipset can include one or more cores, one or more caches, a memory controller (e.g., NVDIMM controller), and a storage protocol controller (e.g., PCIe controller, SATA controller). The host system uses the memory sub-system, for example, to write data to the memory sub-system and read data from the memory sub-system.

The host system can be coupled to the memory sub-system via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system and the memory sub-system. The host system can further utilize an NVM express (NVMe) interface to access components (e.g., memory devices) when the memory sub-system is coupled with the host system by the PCIe interface. The physical host interface can provide an interface for passing control, address, data, and other signals between the memory sub-system and the host system. In general, the host system can access multiple memory sub-systems via a same communication connection, multiple separate communication connections, or a combination of communication connections.

The processing device of the host system can be, for example, a microprocessor, a central processing unit (CPU), a processing core of a processor, an execution unit, etc. In some instances, the controller can be referred to as a memory controller, a memory management unit, or an initiator. In one example, the controller controls the communications over a bus coupled between the host system and the memory sub-system. In general, the controller can send commands or requests to the memory sub-system for desired access to memory devices. The controller can further include interface circuitry to communicate with the memory sub-system. The interface circuitry can convert responses received from the memory sub-system into information for the host system.

The controller of the host system can communicate with the controller of the memory sub-system to perform operations such as reading data, writing data, or erasing data at the memory devices, and other such operations. In some instances, the controller is integrated within the same package of the processing device. In other instances, the controller is separate from the package of the processing device. The controller or the processing device can include hardware such as one or more integrated circuits (ICs), discrete components, a buffer memory, or a cache memory, or a combination thereof. The controller or the processing device can be a microcontroller, special-purpose logic circuitry (e.g., a field programmable gate array (FPGA), an application specific integrated circuit (ASIC), etc.), or another suitable processor.

The memory devices can include any combination of the different types of non-volatile memory components and volatile memory components. The volatile memory devices can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, or a PLC portion of memory cells, or any combination thereof. The memory cells of the memory devices can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), spin transfer torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller (or controller for simplicity) can communicate with the memory devices to perform operations such as reading data, writing data, or erasing data at the memory devices and other such operations (e.g., in response to commands scheduled on a command bus by controller). The controller can include hardware such as one or more integrated circuits (ICs), discrete components, or a buffer memory, or a combination thereof. The hardware can include digital circuitry with dedicated (i.e., hard-coded) logic to perform the operations described herein. The controller can be a microcontroller, special-purpose logic circuitry (e.g., a field programmable gate array (FPGA), an application specific integrated circuit (ASIC), etc.), or another suitable processor.

The controller can include a processing device (processor) configured to execute instructions stored in a local memory. In the illustrated example, the local memory of the controller includes an embedded memory configured to store instructions for performing various processes, operations, logic flows, and routines that control operation of the memory sub-system, including handling communications between the memory sub-system and the host system.

In some embodiments, the local memory can include memory registers storing memory pointers, fetched data, etc. The local memory can also include read-only memory (ROM) for storing micro-code. While the example memory sub-system includes a controller, in another embodiment of the present disclosure, a memory sub-system does not include a controller, and can instead rely upon external control (e.g., provided by an external host, or by a processor or controller separate from the memory sub-system).

In general, the controller can receive commands or operations from the host system and can convert the commands or operations into instructions or appropriate commands to achieve the desired access to the memory devices. The controller can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices. The controller can further include host interface circuitry to communicate with the host system via the physical host interface. The host interface circuitry can convert the commands received from the host system into command instructions to access the memory devices as well as convert responses associated with the memory devices into information for the host system.

The memory sub-system can also include additional circuitry or components that are not illustrated. In some embodiments, the memory sub-system can include a cache or buffer (e.g., DRAM) and address circuitry (e.g., a row decoder and a column decoder) that can receive an address from the controller and decode the address to access the memory devices.

In some embodiments, the memory devices include local media controllers that operate in conjunction with the memory sub-system controller to execute operations on one or more memory cells of the memory devices. An external controller (e.g., memory sub-system controller) can externally manage the memory device (e.g., perform media management operations on the memory device). In some embodiments, a memory device is a managed memory device, which is a raw memory device combined with a local media controller for media management within the same memory device package. An example of a managed memory device is a managed NAND (MNAND) device.

The controller or a memory device can include a storage manager configured to implement storage functions discussed above. In some embodiments, the controller in the memory sub-system includes at least a portion of the storage manager. In other embodiments, or in combination, the controller or the processing device in the host system includes at least a portion of the storage manager. For example, the controller, the controller, or the processing device can include logic circuitry implementing the storage manager. For example, the controller, or the processing device (processor) of the host system, can be configured to execute instructions stored in memory for performing the operations of the storage manager described herein. In some embodiments, the storage manager is implemented in an integrated circuit chip disposed in the memory sub-system. In other embodiments, the storage manager can be part of the firmware of the memory sub-system, an operating system of the host system, a device driver, or an application, or any combination therein.

In one embodiment, an example machine of a computer system within which a set of instructions, for causing the machine to perform any one or more of the methods discussed herein, can be executed. In some embodiments, the computer system can correspond to a host system that includes, is coupled to, or utilizes a memory sub-system or can be used to perform the operations described above. In alternative embodiments, the machine can be connected (e.g., networked) to other machines in a LAN, an intranet, an extranet, or the internet, or any combination thereof. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random access memory (DRAM) such as synchronous DRAM (SDRAM) or Rambus DRAM (RDRAM), static random access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and within the processing device during execution thereof by the computer system, the main memory and the processing device also constituting machine-readable storage media. The machine-readable medium, data storage system, or main memory can correspond to the memory sub-system.

In one embodiment, the instructions include instructions to implement functionality corresponding to the operations described above. While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

connecting a processor sub-system between a first memory sub-system and a second memory sub-system;

receiving a first clock signal;

configuring, in response to the first clock signal, a communication direction of a first connection between the processor sub-system and the first memory sub-system to receive first data in the processor sub-system from the first memory sub-system;

configuring, in response to the first clock signal, a communication direction of a second connection between the processor sub-system and the second memory sub-system to transmit second data from the processor sub-system to the second memory sub-system;

receiving a second clock signal; and reversing, in response to the second clock signal, the communication direction of the first connection and the communication direction of the second connection.

2. The method of claim 1, wherein the first connection and the second connection are implemented via optical fibers.

3. The method of claim 2, wherein the processor sub-system, the first memory sub-system, and the second memory sub-system are mounted on a same printed circuit board.

4. The method of claim 3, wherein the first clock signal and the second clock signal are provided to the processor sub-system, the first memory sub-system, and the second memory sub-system via traces on the printed circuit board.

5. The method of claim 4, wherein the optical fibers are configured in ribbons separate from the printed circuit board.

6. The method of claim 4, wherein the reversing is predetermined for the second clock signal being an odd-number clock signal, or an even-number clock signal.

7. The method of claim 4, wherein the second data includes data to be written via execution of write commands in the second memory sub-system.

8. The method of claim 7, wherein the second data includes data representative of read commands to retrieve data from the second memory sub-system.

9. The method of claim 8, wherein the second data includes data representative of addresses for execution of the read commands and the write commands in the second memory sub-system.

10. The method of claim 9, wherein the first data includes data retrieved from the first memory sub-system after execution of read commands.

11. The method of claim 4, further comprising:

transmitting a read command using the traces on the printed circuit board to receive the first data from the first memory sub-system; and transmitting a write command using the traces on the printed circuit board to write the second data into the second memory sub-system.

12. The method of claim 4, further comprising:

transmitting a first address using the traces on the printed circuit board to receive the first data from the first memory sub-system; and transmitting a second address using the traces on the printed circuit board to write the second data into the second memory sub-system.

13. A device, comprising:

one or more buffers;

an optical receiver;

an optical transmitter;

an optical connector operable to an optical fiber to the optical transmitter through the optical receiver; and a controller coupled to the one or more buffers and configured to operate a combination of the optical receiver and the optical transmitter in either a transmission mode or a reception mode;

wherein the optical transmitter is configured to modulate optical signals coming from a light source toward the optical connector in the transmission mode; and the optical receiver is configured to detect optical signals propagating from the optical connector toward the optical transmitter in the reception mode.

14. The device of claim 13, wherein the optical receiver is configured to detect optical signals coming from the optical transmitter toward the optical connector in the transmission mode; and the controller is configured to detect transmission errors based on signals detected by the optical receiver in the transmission mode.

15. The device of claim 13, wherein the optical transmitter is configured to attenuate optical signals passing through the optical transmitter in the reception mode.

16. The device of claim 13, further comprising:

a logic die containing the controller; and an active interposer containing the optical receiver, the optical transmitter, the optical connector, and wires configured to connect a ball grid array to the logic die.

17. A non-transitory computer storage medium storing instructions which, when executed in a computing device, cause the computing device to perform a method, comprising:

compiling a program of a computation task based on a transaction level model of a systolic processor having a processor sub-system connected to two separate memory sub-systems, including a first memory sub-system and a second memory sub-system;

mapping, based on the compiling, memory addresses in the program to the two memory sub-systems; and generating instructions for the systolic processor to read from the first memory sub-system and write to the second memory sub-system in a first set of predetermined clock cycles, and to write to the first memory sub-system and read from the second memory sub-system in a second set of predetermined clock cycles, wherein the first set of predetermined clock cycles and the second set of predetermined clock cycles are mutually exclusive.

18. The non-transitory computer storage medium of claim 17, wherein the method further comprises:

adding a memory sub-system differentiation bit to a memory address in the program of the computation task;

wherein when the memory sub-system differentiation bit has a first value, the memory address is in the first memory sub-system; and wherein when the memory sub-system differentiation bit has a second value, the memory address is in the second memory sub-system.

19. The non-transitory computer storage medium of claim 17, wherein the method further comprises:

configuring instructions to be executed by the processor sub-system to generate a memory sub-system differentiation bit for a memory address used to access memory;

wherein when the memory sub-system differentiation bit has a first value, the memory address is accessed in the first memory sub-system; and wherein when the memory sub-system differentiation bit has a second value, the memory address is accessed in the second memory sub-system.

* * * * *